April 19, 1949.   W. H. HOWE   2,467,752
WRAPPED WIRE STRAIN GAUGE

Filed Aug. 15, 1944   2 Sheets-Sheet 1

INVENTOR
Wilfred H. Howe
BY
Blair, Curtis & Hayward
ATTORNEYS

April 19, 1949. W. H. HOWE 2,467,752
WRAPPED WIRE STRAIN GAUGE
Filed Aug. 15, 1944 2 Sheets-Sheet 2

INVENTOR
*Wilfred H. Howe*
BY
*Blair, Curtis + Hayward*
ATTORNEYS

Patented Apr. 19, 1949

2,467,752

UNITED STATES PATENT OFFICE 2,467,752

WRAPPED WIRE STRAIN GAUGE

Wilfred H. Howe, Sharon, Mass., assignor to The Foxboro Company, Foxboro, Mass., a corporation of Massachusetts Application August 15, 1944, Serial No. 549,532

4 Claims. (Cl. 201—63)

This invention relates to fine electrical strain sensitive metallic wire strain gauges for measuring dimensional changes in a member caused by subjecting it to stress.

Fine metallic wire strain gauges of the bonded type disclosed by Edward E. Simmons, Jr., in United States Patents 2,292,549, issued August 11, 1942, and 2,316,203, issued April 13, 1943, are limited in their application to members the dimensions of which are of sufficient magnitude to accommodate the wire gauge. For example, if it is desired to measure stresses of the order of 1 to 100 lbs., it would be possible to attach the ordinary strain gauge, disclosed in said patents, to a strip of thin flat metal, selecting a thickness of metal of such value that the total cross section is reduced to a size where moderate strain would result from total stresses of the order mentioned. However, particularly for the lower values of stress, metal strips of this type would have to be made very thin indeed and so would be mechanically weak and would be particularly subject to corrosive effects and general uncertainty.

It is an object of the present invention to obtain an improved strain gauge element of the fine metallic wire type. Preferably, as is understood by those skilled in the art, the wire used would be of an alloy having a low temperature coefficient of electrical resistance. The invention may be demonstrated by a closely wound helix of fine (say, 0.001 inch diameter wire of "Constantan" or "Advance" resistance alloy) wire applied to an ordinary rod or tube of suitable cross section. If tension is applied to such a rod or tube, the length of the tube is increased and its diameter and periphery are decreased. When the strain gauge wire has been properly applied, tension applied to the rod produces compression of the wire and the resistance of the wire is decreased. This improved method of construction provides a very small, compact and rugged unit capable of measuring moderate and small tensile and compressive stresses.

Figure 1:
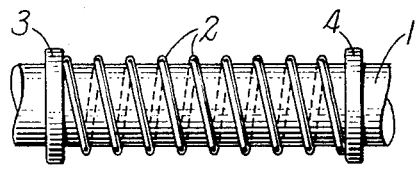
Figure 1 shows one embodiment of the invention.

Referring to Figure 1, a rod 1 of suitable cross section is coated with a film of electrical insulating varnish such as is sold commercially under the trade names "Bakelite" or "Glyptal" varnish. This insulating film on the surface of the rod prevents electrical leakage and short circuits between portions of the resistance wire helix through the rod 1. The very fine metallic wire 2 is wound in a uniformly spaced helix over the insulating varnish film. The wire 2 may be of suitably small size so that a high electrical resistance per unit of length is obtained. (Obviously the shape of the wire is unimportant, whether round, flat or otherwise.) Commercial availability and the difficulty of handling small wires establish 0.001 inch diameter as a practical lower limit. In order to obtain good electrical connections and to secure the very fine resistance wire upon the rod 1, collars 3 and 4 may be fixed upon (but insulated from) rod 1, and to these collars both the resistance wire 2 and its external leads may be soldered. It is apparent that the resistance wire 2 can be held in intimate contact with the insulated surface of rod 1 by any one of a number of methods. For example, the wire 2 may be held in intimate contact by using a bond of cement such as the well-known "Duco" cement or "Glyptal" cement. Also it is possible to secure the wire 2 in place by winding the wire 2 on the rod 1 with either the wire or the rod or both in a condition of tensile strain.

For a considerable proportion of the arrangements on which a structure of this invention would be used, the elasticity of the resistance wire 2 stretched tightly around the rod 1 is sufficient to provide satisfactory response.

In the structure of Figure 1, if tension is applied to rod 1, the cross section of the rod decreases in direct proportion as the length increases. On this basis, the periphery of the rod is decreased only about one half as much per unit length as the rod is stretched. If the resistance wire is wound onto an unstretched rod with a tensile stress on the wire close to its elastic limit, then the rod can be strained in tension by twice the amount of strain on the wire before the strain in the wire will have been fully released and the device ceases to function.

Figure 2:
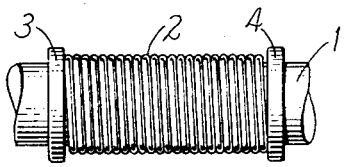
Figures 2, 3 and 4 show modifications thereof.

In Figure 2, the resistance wire 2 has been wound in a close packed helix on rod 1. The wire 2 is secured by soldering to collars 3 and 4 to which electrical connections are also made. As described above, before winding, an insulating film of suitable varnish had been applied to the surface of rod 1. The winding of resistance wire 2 may be bonded to the rod 1 by cement, or it may be held in place by the tension of winding.

Figure 3:
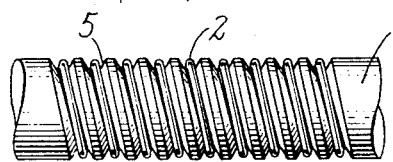

In Figure 3 a modification is shown in that the rod 1 is provided with a screw thread groove 5 into which the resistance wire 2 is wound after the film of insulating varnish has been applied. When the resistance wire is secured to rod 1 by winding tension, the groove 5 prevents the wire 2 from slipping from its position if it should become loosened due to a temporary overload of rod 1. Collars similar to 4 and 5 in Figure 1 are provided (but not shown) as before, to secure the resistance wire 2 and to provide electrical connections.

Figure 4:
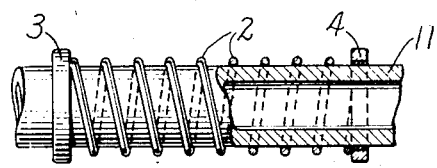

Figure 4 is similar to Figure 1 except rod 1 has been replaced by a tube 11 of suitable cross section to obtain the desired strain for the applied stress.

Figure 5:
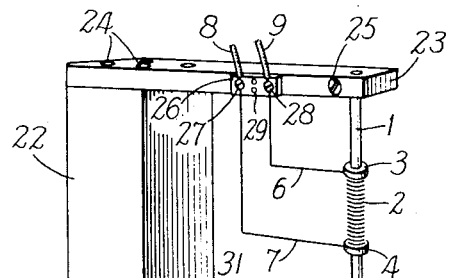
Figures 5, 6 and 7 illustrate typical applications of the invention.
Figure 6:
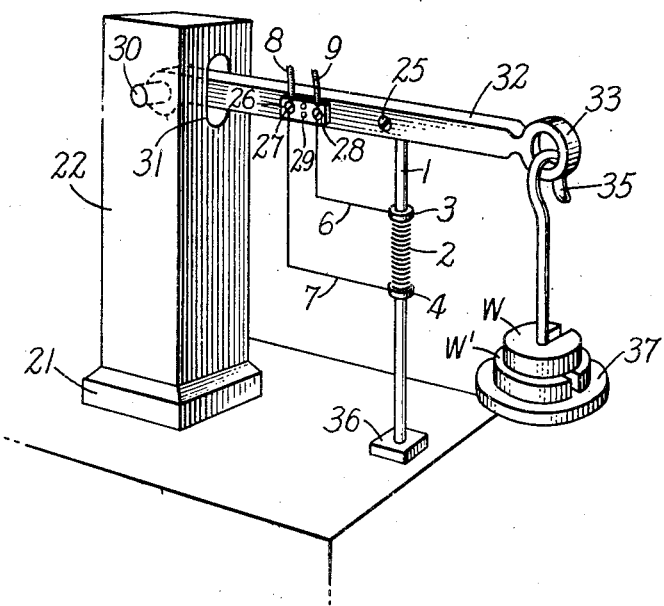

Figures 5 and 6 illustrate generally a typical application of the invention directed to a measurement of strain. In Figure 5 there is shown a column 22 mounted firmly upon base 21 which supports rigidly top mounting plate 23 fastened to column 22 by staked pins 24. Rod 1 is held in place in a hole in the outer end of plate 23 by set screw 25.

As described in connection with Figure 2, a close wound helix of fine resistance wire 2 is wound along a suitable section of rod 1 to which a coat of insulating varnish had been applied. Collars 3 and 4 are provided by which the ends of wire 2 are held in place. Electrical connection wires 6 and 7, soldered to collars 3 and 4, lead from the strain-sensitive gauge to binding posts 27 and 28 on a terminal block 26 which may be mounted on plate 23 (as shown) or on column 22 to suit convenience. Terminal block 26 may be fastened to plate 23 by bolts 29.

Electrical connections to an external measuring instrument (not shown) are indicated by wires 8 and 9 which also attach to binding posts 27 and 28 on terminal block 26.

Pivoted about arbor 30 and mounted in slot 31 in column 22 is lever arm 32, the outer end of which terminates in ring 33. At a point so spaced from arbor 30 that rod 1 forms a vertical axis, rod 1 is fastened by set screw 34 in a hole in lever arm 32. The length of rod 1 is made such that lever arm 32 is substantially parallel to plate 23.

Weight holder 37 is provided with a hook 35 so that it hangs suspended from ring 33. Removable weights W and W' are provided so that the loading on arm 32 may be considered variable.

Arm 32, plate 23 and column 22 are made massive in comparison with the dimensions of rod 1, so that substantially all of the dimensional changes due to the stress imposed by the weights occurs in rod 1. The diameter of rod 1 is determined by the range of stresses which are to be measured.

Figure 5 illustrates generally the class of measurement where the variable stress to be measured is applied to rod 1 as a tensile stress. Although the specific illustration is one of weighing, stress resulting from other causes can be applied to ring 33 or to rod 1 directly.

As the load on weight holder 37 is changed, for example, from W to W+W', the tensile stress on rod 1 is increased, the increased tensile stress elongates the rod 1 and its periphery correspondingly decreases. The decreased periphery results in reducing the degree of distention of the strain gauge wire 2, thus increasing its cross section and reducing its electrical resistance. The change in resistance due to change in load on weight holder 37 may be measured by any of the usual electrical methods, as by a Wheatstone bridge circuit.

Figure 6 illustrates essentially the same physical arrangement as Figure 5, except that the method of fastening rod 1 has been changed so that it is fastened rigidly to block 36, which is stationary, as is base 21, instead of to plate 23. By this change, the stresses imposed on rod 1 by changing the loading on weight holder 37 become compression stresses instead of tension stresses. Otherwise the principles involved are not changed.

Figure 7:
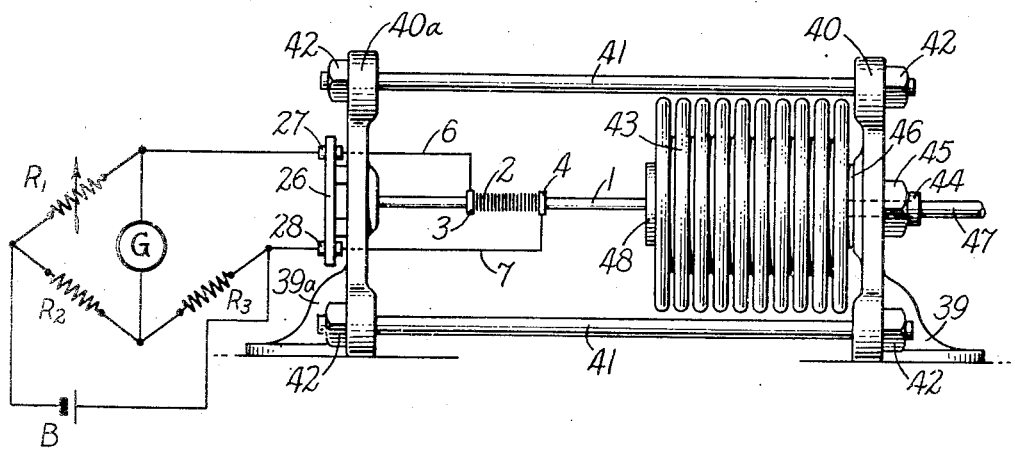

Figure 7 illustrates a method of using this type of strain sensitive element for the measurement of pressure. In this figure two end plates 40 and 40a are provided with lugs 39 and 39a by which the assembled unit may be mounted in an instrument case. The two end plates 40 are held rigidly apart by spacer rods 41 which pass through holes in plate 40 and are held in position by nuts 42. Bellows 43, which may be of the type commercially known as a "hydron," is mounted rigidly to end plate 40 by nut 45 and hollow stud 44 carried by disc 46 soldered to one end of bellows 43. Pressure is admitted to bellows 43 through tubing 47 communicating to the interior of bellows 43 through hollow stud 45 to which the tubing may be sealed by soldering.

Rod 1 is rigidly fastened between end plate 40a and disc 48 mounted on the "free" or movable end of bellows 43. As before, strain gauge resistance wire 2 is wound on rod 1 whose surface has previously been coated with an insulating film, collars 3 and 4 being employed to retain the ends of wire 2. Electrical connections are made to collars 3 and 4 by means of wires 6 and 7 which lead to terminals 27 and 28 respectively on terminal block 26 mounted on end plate 40a.

By means of this construction, any value of pressure above atmospheric pressure, communicated to bellows 43 by tubing 47, results in a force acting in compression on rod 1 at the "free" end of bellows 43. The compression stresses act to shorten rod 1 and to increase its diameter and periphery. This change, in turn, increases the tension upon strain gauge resistance wire 2, increasing its length and decreasing its cross section thereby increasing its resistance.

For values of pressure below atmospheric pressure the force acting at the "free" end of the bellows acts in reverse to the above description and places the rod 1 under stresses in tension.

The changes in value of resistance of the strain gauge resistance wire 2 may be measured by any of the well-known electrical methods. A simple Wheatstone bridge method is illustrated by way of example, whereby the value of resistance between the terminals 27 and 28 can be balanced by manual adjustment of $R_1$, until no deviation of the pointer of galvanometer G from zero is observed, the value of the terminal resistance at 27 and 28 being determined from the electrical values of the bridge $R_1$, $R_2$, $R_3$. At B is shown a source of electric current to energize the bridge.

It will of course be understood that various changes in details of construction and arrangement of parts may be made by those skilled in the art without departing from the spirit of the invention as set forth in the appended claims.

1. For use in force measuring apparatus of the type wherein the change of electrical resistance of a fine metallic filament, caused by a change in the strain of said filament corresponding to the change in the strain of a member to which is applied the force to be measured, is used as a measure thereof; a force sensitive element comprising, in combination, a cylindrical member adapted to be variably strained by application of the force thereto in a direction parallel to the axis of said member, the surface of said member being indented with a spiral groove over a portion of its length, a filamentary element coiled under tension around said cylindrical member in said spiral groove, and anchoring means for mechanically anchoring only the two ends of said filamentary element to said member to hold said element coiled under tension.

2. The method of making a force sensitive element for use in force measuring apparatus of the type wherein the change of electrical resistance of a fine metallic filament, caused by a change in the strain of said filament corresponding to the change in the strain of a member to which is applied the force to be measured, is used as a measure thereof; comprising the steps of placing a cylindrical member under tension to place it in a condition of tensile strain, tightly winding a filamentary element helically around said strained member, mechanically fastening only the two ends of said filamentary element to said member while holding said member so strained, and releasing the tension on said member to remove the tensile strain.

3. The method of making a force sensitive element for use in force measuring apparatus of the type wherein the change of electrical resistance of a fine metallic filament caused by a change in the strain of said filament corresponding to the change in the strain of a member to which is applied the force to be measured, comprising the steps of straining a cylindrical member by placing it under tension, stretching a filamentary element, winding said stretched filamentary element helically around said stretched member, mechanically fastening only the two ends of said stretched filamentary element to said strained member, and releasing the tension from said member.

4. For use in tensile force measuring apparatus of the type wherein the decrease in the electrical resistance of a fine metallic filament due to a reduction in the strain of said filament corresponding to the increase in the strain of a member to which is applied the tensile force to be measured, is used as a measure thereof; a tensile force sensitive element, comprising, in combination, a cylindrical member adapted to be variably strained in tension by application of stretching force thereto in a direction parallel to the axis of said cylindrical member and whereof the degree of force is to be measured, the surface of said member being indented with a helical groove over a portion of its length, a filamentary element stretched nearly to its elastic limit and wound in said helical groove around said cylindrical member, and anchors for mechanically fastening only the two ends of said filamentary element to said cylindrical member while said element is stretched nearly to its elastic limit normally to hold said element in its stretched condition, whereby the range of tensile force measurement is extended to the full range of elasticity of the filamentary element when a stretching force is applied to said cylindrical member along its axis.

WILFRED H. HOWE.

REFERENCES CITED

The following references are of record in the file of this patent:

UNITED STATES PATENTS

| Number | Name | Date |
| --- | --- | --- |
| 2,036,458 | Carlson | Apr. 7, 1936 |
| 2,059,549 | Carlson | Nov. 3, 1936 |
| 2,292,549 | Simmons | Aug. 11, 1942 |
| 2,327,935 | Simmons | Aug. 24, 1943 |
| 2,334,843 | Ruge | Nov. 23, 1943 |
| 2,340,146 | Ruge | Jan. 25, 1944 |
| 2,364,076 | Jordan | Dec. 5, 1944 |
| 2,365,015 | Simmons | Dec. 12, 1944 |
| 2,391,966 | Harrison | Jan. 1, 1946 |